March 1, 1932.  W. H. PRATT  1,847,897

ELECTRIC TERMINAL BOX

Filed Aug. 11, 1930

Inventor:
William H. Pratt;
by Charles V. Tullar
His Attorney.

Patented Mar. 1, 1932

1,847,897

UNITED STATES PATENT OFFICE

WILLIAM H. PRATT, OF LYNN, MASSACHUSETTS, ASSIGNOR TO GENERAL ELECTRIC COMPANY, A CORPORATION OF NEW YORK

ELECTRIC TERMINAL BOX

Application filed August 11, 1930. Serial No. 474,362.

My invention relates to electric terminal boxes or blocks such as those employed with electric meters to facilitate connections between the meter circuits, the supply lines and the load lines, and having provisions for connecting a test meter thereto. The object of my invention is the provision of such a meter terminal box having handy disconnecting clips between the meter and line terminals so arranged as to prevent short circuits occurring between adjacent terminals during the connecting and disconnecting operations that occur when a test meter is connected in series with the meter to be tested.

Figure 1:
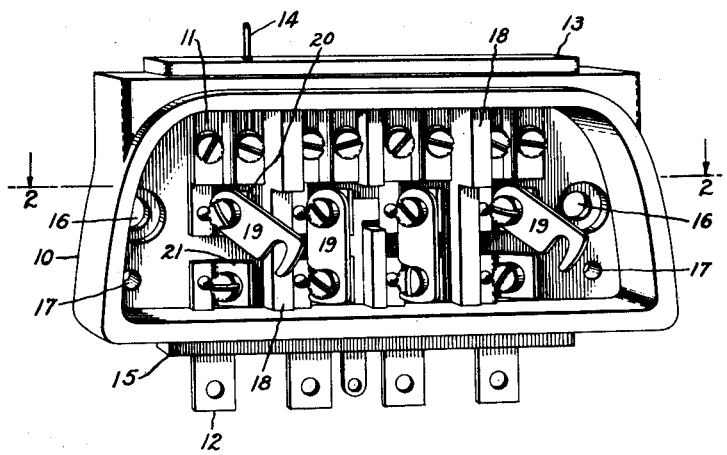
Figure 2:
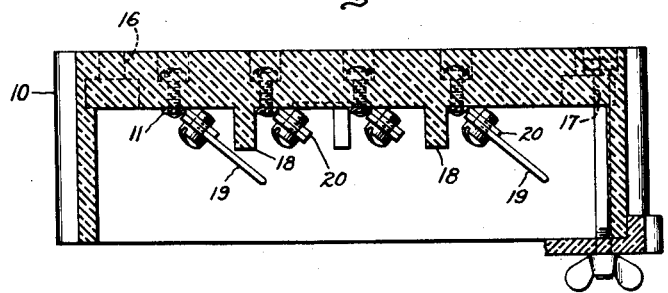

The features of my invention which are believed to be new and patentable will be pointed out in the claim appended hereto. For a better understanding of the invention reference is made in the following description to the accompanying drawings which shows in Fig. 1 a front perspective view of the terminal box with the cover removed and Fig. 2 shows a cross-section through the box taken on line 2—2 of Fig. 1.

The terminal box structure 10 is preferably made of some suitable molded insulation compound or product and the stationary terminal connectors are preferably secured in place on the back inner wall of the box when the latter is formed in the molding operation.

In the illustration four sets of main upper and lower terminals are shown as arranged for the current and voltage circuits for a single phase meter. The upper terminals 11 are for connections to the meter and the lower terminals 12 are for connection to the line and load. The box represented is for a bottom connected meter and the upper surface of the box will be shaped to fit the bottom of the meter. The projecting portion 13 which contains conductor openings communicating with the upper terminals will preferably fit into a suitable recess in the meter casing, not shown, and the connecting wires between the meter and terminal box, one of which is indicated at 14, will be carried through alined openings in the abutting surfaces rendering the conductors inaccessible at this point. The lower terminals 12 extend downward through the lower wall and the projecting part 15, which part may fit into a recess in the upper wall of the usual fuse box, not shown. The cover of box 10 is removed in Fig. 1 to better expose the interior arrangement but when in place it is intended to be sealed to prevent unauthorized access to the connections. The openings 16 are provided to secure the box to a back support by means of bolts and the openings 17 are provided for seal pins or bolts which extend upward through the cover when in place as indicated in Fig. 2. Low insulating barriers 18 integral with the box structure are preferably provided between the different sets of upper and lower terminals. The number of such terminals and other details of their arrangement for connection to the meter and fuse box will vary under different conditions.

The particular feature of novelty in the terminal box is in the arrangement of the disconnecting clips 19 between the sets of upper and lower terminals. They are so arranged as to facilitate quick disconnection and attachment of test meter leads thereto without danger of short circuit. It will be noted that the parts 20 and 21 of the upper and lower terminals which contact with the terminal clips are bent upward at an angle of about 45 degrees from the main portion of the terminals. The terminal clips 19 are hinged with the part 20 with a screw and the lower end of the clip is provided with a slot adapted to embrace a screw in the part 21 when swung to the connecting position. Tightening of the screws gives a good electrical connection. The two outer clips are shown disconnected and swung upward and to one side of the lower terminal. If the upper screw is tightened these clips remain in the open position and provide handy rigid terminals for attachment to test leads. Their free ends are sufficiently removed from all adjacent conducting parts to afford little danger of short circuit and are swung away and to one side of the lower terminal screw so that test leads may be easily secured thereby with a screwdriver without danger of causing an accidental short circuit with the screw-driver. The arrangement also provides a handy means of disconnecting and connecting the electric service without disturbing the meter and other parts of the installation. The clips are thus arranged to swing in substantially parallel planes when moved from connecting to disconnecting position and vice versa, such planes being at an angle of about 45 degrees to the back wall of the compartment. When I say about 45 degrees I of course do not wish to be limited to this exact angle because it may vary considerably with the device still retaining the desirable features explained.

What I claim as new and desire to secure by Letters Patent of the United States is:

A terminal box comprising a compartment with a back wall and a removable cover, a plurality of circuits extending through said box and secured to the back wall thereof, each circuit comprising spaced terminals and a clip hinged to one terminal and adapted to be swung into contact with the other terminal and to be secured thereto by a screw, said terminals and clips being accessible when the cover is removed, the hinged clips being movable in substantially parallel planes when swung from a connecting to a disconnecting position or vice versa, said planes lying at an angle of about 45 degrees to the back wall of the compartment.

In witness whereof I have hereunto set my hand this 7th day of August, 1930.

WILLIAM H. PRATT.